United States Patent [19]

Newcomb

[11] 4,280,591

[45] Jul. 28, 1981

[54] WHEEL LINE CHAIN LUBRICATOR

[76] Inventor: Ross G. Newcomb, Rte. 5, Rupert, Id. 83350

[21] Appl. No.: 53,354

[22] Filed: Jun. 29, 1979

[51] Int. Cl.³ .......................... F16N 7/24; B05B 3/00
[52] U.S. Cl. .................................. 184/17; 239/177; 239/721; 474/91
[58] Field of Search ................ 239/177, 178; 137/344; 184/15 R, 17; 474/91

[56] References Cited

U.S. PATENT DOCUMENTS

| 587,409 | 8/1897 | Taylor | 184/17 |
|---|---|---|---|
| 2,548,739 | 4/1951 | Peck | 184/15 R X |
| 2,670,069 | 2/1954 | Dobkin | 184/17 |
| 2,720,941 | 10/1955 | Carson | 184/17 X |
| 2,823,553 | 2/1958 | Harrington | 474/91 |
| 2,893,516 | 7/1959 | Bocchino | 184/17 |
| 3,318,531 | 5/1967 | Funk | 239/117 X |
| 3,463,267 | 8/1969 | Dooley et al. | 184/15 R X |
| 3,762,643 | 10/1973 | Allen | 184/15 R X |
| 4,134,422 | 1/1979 | Batson | 238/178 X |

FOREIGN PATENT DOCUMENTS 20597 of 1899 United Kingdom .................... 184/17

Primary Examiner—David H. Brown
Attorney, Agent, or Firm—Richard F. Bojanowski

[57] ABSTRACT

The chain lubricating system of this invention includes an oil reservoir and a partially submerged sprocket wheel. The sprocket wheel is loosely carried on a stationary axle mounted within the reservoir to permit both rotation and lateral slidable movement thereon. The teeth of the sprocket are characterized to urge oil into the links and rollers of the drive chain as it is moved over the rotating sprocket.

10 Claims, 5 Drawing Figures

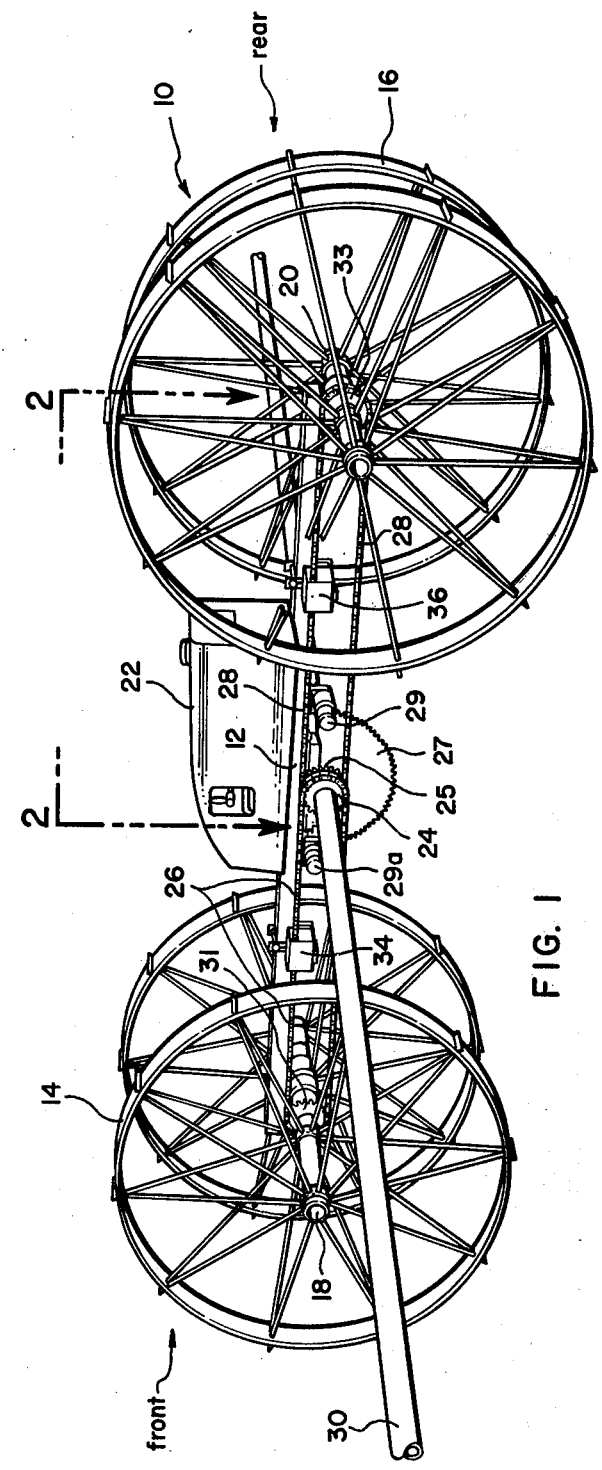
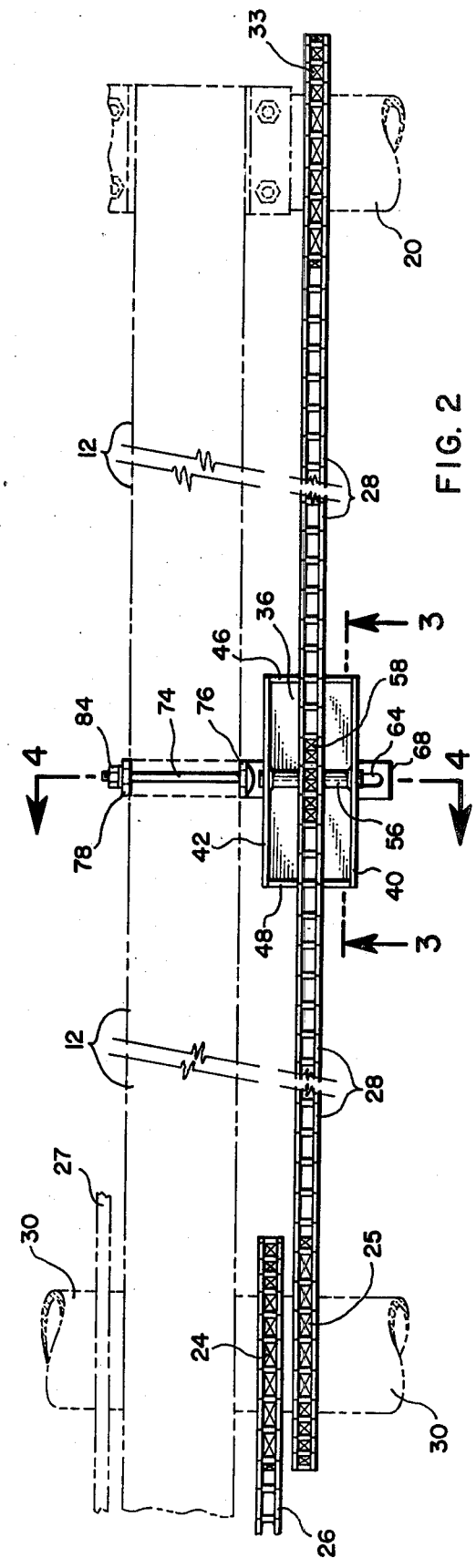
FIG. 1
FIG. 2

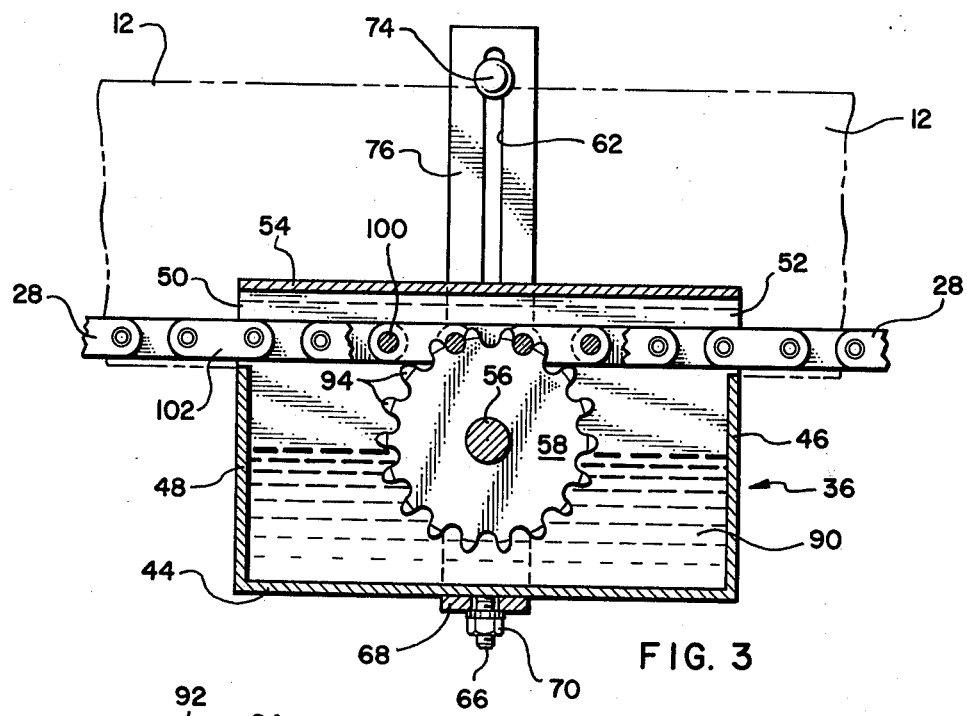
FIG. 3
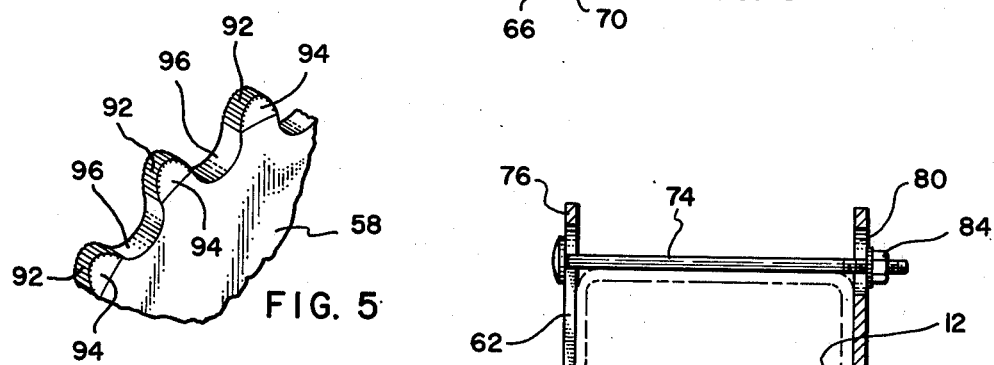
FIG. 5
FIG. 4
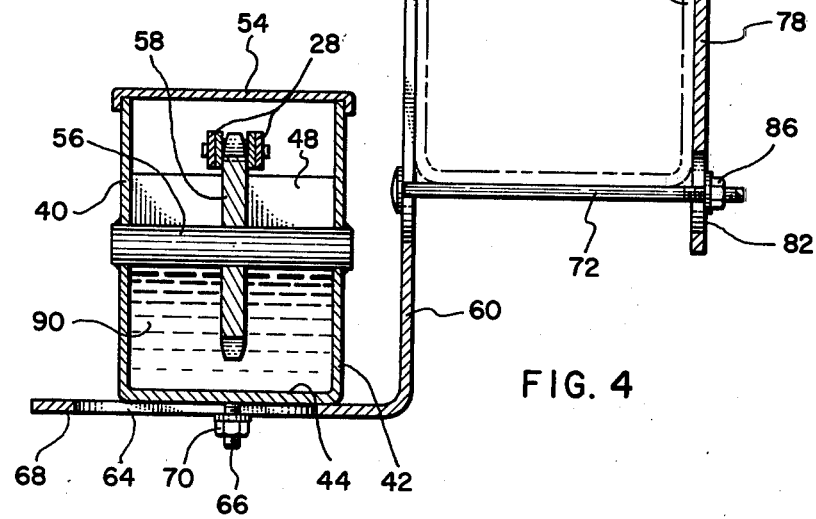

WHEEL LINE CHAIN LUBRICATOR

BACKGROUND OF THE INVENTION

1. Field of the Invention

This invention relates to chain lubricating systems and particularly to an oil reservoir adapted to lubricate a horizontal drive chain used on wheel line irrigation systems.

2. State of the Art

Wheel line irrigation systems are commonly used throughout the United States for irrigating agricultural lands. Generally, the wheel line irrigation systems include a four wheeled motorized drive carriage of the type shown in FIG. 1 of the drawing. Extending laterally in each direction from the drive carriage are a series of connected four to five inch diameter aluminum water carring pipes. The connected pipes can extend out laterally to a length of about 152 meters (500 feet), in both directions. At intervals of about 15 meters (50 feet), a 1.5 to 3.0 meters (5 to 10 feet) diameter roll wheel is fixed to the pipe for carrying the pipe across a field on movement of the drive carriage.

One end of the laterally extending pipe is adapted with a coupler for connecting to a water main. The other end of the pipe is normally closed. Sprinkling heads are mounted in spaced alignment along the pipes intermediate the follow wheels for distributing water carried by the pipe onto an agricultural field. The irrigation system is moved longitudinally down the field by a geared six to seven horsepower gasoline engine.

Power from the gasoline engine is transferred to the drive carriage through an over sized bull gear to which are mounted a pair of side by side drive sprockets. The front and rear axle of the drive carriage contains a geared sprocket fixed thereto. A continuous chain connects one of the drive sprockets with the sprocket fixed to the front axle. A second continuous chain connects the other drive sprocket with the sprocket fixed to the rear axle.

As stated above, power from the gasoline engine is transferred to a bull gear. The bull gear contains an annular opening through which the water carrying pipe passes and is secured thereto. This arrangement causes the pipe to slowly rotate as the bull gear rotates. The torque generated by the slowly turning water pipe causes the follow wheels fixed thereto to turn and thereby "roll" the laterally extending water pipe down the field.

As indicated above, the drive carriage is moved first in one direction and then in the other direction by means of a pair of drive chains. The first drive chain is connected to the front axle of the drive carriage and the geared gasoline engine. The second drive chain connects the rear axle of the drive carriage and the geared gasoline engine. It is for these drive chains that the lubricating reservoir of this invention was designed and which will subsequently be discussed in greater detail.

The open drive chains measure about 12 to 18 feet in length and are relatively expensive to replace on a periodic basis.

One of the major problems associated with the wheel line irrigation systems above described is that the drive chains are normally exposed, that is, they are not contained within a housing. As a result, the interconnected rollers and links which make up the chain are continually subjected to moisture from the sprinkling system, as well as, dirt and dust from the fields. If the chains are not lubricated on a regular basis, the links and rollers become "stiff" and eventually lock creating an irregular or jerking motion to the water carrying pipe during rotation. This jerking action causes a substantially increased torque force on the laterally extending water carrying pipe. As the torque force is increased the laterally extending pipes are weakened causing crimping and even snapping of the pipes. This results in costly repairs and down-time which has an adverse effect on costs of operation and crop production.

In addition, to the above, the chain is continually exposed to sun, dust, and sand which tends to remove or dry the lubricants that have been applied manually to the chain. This subjects the chain and sprocket system to servere abrasive wear necessitating frequent repair and replacement. Such repairs also result in unnecessary costly down-time which, in turn, adversely affects crop production.

Since the irrigation systems are also used for applying fertilizers, insecticides, and herbicides to the fields, the opportunities for the chain to be exposed to corrosive elements are substantially increased.

OBJECTS OF THE INVENTION

To overcome the above problems, it is a primary object of this invention to provide a system for automatically lubricating drive chains on a continuous basis. Still another object of this invention is to provide a chain lubricating system which is simple in design and practical in use. Yet, another object of this invention is to provide a chain lubricating system which is readily adaptable to most wheel line irrigation systems and does not involve major problems of installation or maintenance. Other objects of this invention will become apparent upon review of the specification which follows and to the drawings appended hereto.

SUMMARY OF THE INVENTION

These and other objects of this invention are attained by the chain lubricating systems which broadly comprises an axially slidable, lubricant depositing sprocket rotatably carried within a lubricant holding reservoir. The reservoir contains oil and other lubricants which are carried upwardly by the rotating sprocket and forced into a drive chain riding thereover.

BRIEF DESCRIPTION OF THE DRAWINGS

FIG. 1 is a perspective view of a typical drive carriage to which is mounted the lubricating system of this invention.

FIG. 2, is a horizontal cross-section taken along line 2—2 of FIG. 1.

FIG. 3, is a vertical cross-section of the lubricating system taken along line 3—3 of FIG. 2.

FIG. 4, is a vertical cross-section of the lubricating system mounted to the frame of the drive carriage taken along 4—4 of FIG. 2.

FIG. 5, is a partial perspective view of several teeth of the lubricant depositing sprocket.

DESCRIPTION OF THE PREFERRED EMBODIMENT

Referring to FIG. 1, for purposes of orientation, a wheeled drive carriage identified generally by the numeral 10 is shown. The wheeled drive carriage includes a longitudinal frame 12, a pair of front wheels 14 secured to a rotatable front axle 18 and a pair of rear wheels 16 secured to a rotatable rear axle 20.

A pair of side by side connected drive sprockets 24 and 25 are fixed along one of its sides to a bull gear 27 rotatably mounted to the longitudinal frame 12. The bull gear is rotated by a pair of orbit gears 29 and 29a connected through a gear transmission (not shown) carried within the power source 22. A first continuous chain 26 overrides drive sprocket 24 and driven sprocket 31 fixed to the front axle 18 of the drive carriage 10. A second continuous chain 28 overrides drive sprocket 25 and a driven sprocket 33 mounted to the carriages' rear axle 20. Movement of the drive carriage in a forward and rearward direction is controlled by a gear shift (not shown) which actuates one of the orbit gears 29 or 29a with the bull gear 27.

A liquid carrying tubular pipe 30 extends laterally and axially from the drive carriage by passing through and being fixed within an annular opening in the bull gear 27 and drive sprockets 24 and 25. At intervals of approximately 15 meters (50 feet) from the drive carriage, a plurality of follow sheels (not shown) are fixed to the water carrying pipe. One of the ends of the liquid carrying pipe is adapted with a connector for attachment to a main water conduit source. The other end is normally closed. Self leveling sprinkling heads are mounted at intervals of approximately 15 meters (50 Feet) for distribution of water over the terrain. When the power source is actuated, the follow wheels fixed to the water pipe roll the water carrying pipe down the field by means of the torque action generated by the geared power source turning the water carrying pipe.

Intermediate the front wheels 14 and the power source 22 is a first oil reservoir 34 adjustably fixed to the frame 12 for lubricating a continuous chain 26. This chain, as previously noted, transmits forward movement to the drive carriage 10. A second oil reservoir 36 is adjustably fixed to frame 12 intermediate the rear wheels 16 and the power source 22. This second oil reservoir 36 is identical to the first oil reservoir 34 and is used to lubricate a second continuous chain 28 which moves the drive carriage 10 in a rearward direction.

Referring to FIGS. 3 and 4, the second oil reservoir 36 is shown in greater detail. The oil reservoir is generally rectangularly shaped and includes a pair of side walls 20 and 42, a bottom wall 44 a front wall 46 and back wall 48. The front and back walls have an upper sloted opening 50 and 52 respectively through which chain 28 can enter and exit the reservoir. To prevent excessive dirt and debris from entering the reservoir 36, a removable cover 54, is provided. A stationary shaft 56 is fixed to the side walls 40 and 42 of the reservoir. A rotatable sprocket 58 is carried on the shaft 56, such that it can slide laterally and axially thereon. This permits the sprocket to slideably move along the shaft and to adjustably align itself with the continuous chain 28 which enters the slotted opening 52 and passes over the top of the sprocket 58. The chain exits through slotted opening 50. Slots 50 and 52 and removable cover 54 permit the reservoir to be added to existing irrigation systems and its continuous chains can be placed on the rotatable sprocket without the need of opening the continuous chain. The reservoir 36 is adjustably fixed to the frame 12 by an angled or "L" shaped bracket having a slotted vertical member 62 and a slotted horizontal member 64. A bolt 66 fixed to the bottom wall 44 of the reservoir passes through a slot 68 of the horizontal member 64 and held thereto by a nut 70. This permits the reservoir to be adjustably moved and positioned along the horizontal member 64.

The vertical member 62 is mounted to the frame 12 by means of two long bolts 72 and 74 which passes through a slot 76 cut into the vertical member 60. The bolts enter a holding plate 78 having holes or slots 80 and 82 respectively. The vertical member 62 bolts 72 and 74 and holding plate 78 are securely held in position about frame 12 by nuts 84 and 86 respectively.

The reservoir is normally filled one half to three fourths full with a lubricating fluid such as oil 90 which is carried upward and deposited on a chain 28 by rotation of a sprocket 58.

Sprocket 58, as shown in FIG. 5, is preferably constructed from a plastic material such as high density polyethylene, polypropylene, polyvinylchloride (PVC) and the like. Through experience, it has been found that such materials are capable of transporting the oil contained in the reservoir to the chain more effectively than metal type sprockets. It is believed that this increased efficiency is achieved by virtue of the plastic material being capable of clinging and carrying lubricants in greater quantities than can sprockets constructed from a metallic substance.

To further increase the efficiency of the amount of oil that is carried to the chain, the surface 92 of the teeth 94 of the sprocket 58 are axially serrated or grooved 96 or otherwise roughened so that they are non-smooth. This form of design tends to create pockets for holding and carrying the lubricants upward form the reservoir in much the same fashion as would a bucket type elevator or conveyor.

The valleys 96, between the teeth 94, as well as, the surfaces of the teeth 92 carry sufficient amounts of oil upward for deposit on and between the steel-bushed rollers 100, and links 102, which interlock and form the chain 28. The valley between the teeth may also be concaved to form small pockets for holding and carrying a lubricant fluid upward from the reservoir for deposit on a continuous chain passing thereover. The chain is of conventional design and is normally referred to as a steel-bushed roller type chain.

In operation the chains 26 and 28 are moved through their respective oil reservoirs 34 and 36 whenever the drive carriage is moved either forwardly or rearwardly. As the carriage is moved, the continuous chains which connect the front and rear axle of the carriage and the power source 22 enters the oil reservoir and passes over the sprocket 58 contained within each of two reservoirs 34 and 36. Oil is carried upwardly by the teeth 94, of the sprocket during rotation and the oil or lubricating material is forced between the interconnected rollers 100 and links 102.

The above system provides a convenient and economical means for preventing excessive wear and deterioration of the continuous chain during its use in the open fields.

While this invention has been described with reference to certain specific embodiments, it should be understood that changes may be made by one skilled in the art, but such changes would not depart from the spirit and scope of this invention which is limited only by the claims appended thereto.

I claim:

1. An apparatus for lubricating a continuous chain comprising a reservoir for holding a preselected amount of a lubricating fluid, said reservoir having a front wall, a rear wall, a bottom wall and two side walls, a stationary axle carried within said reservoir and fixed to said sidewalls at a centrally located point, a sprocket wheel loosely carried on said axle to permit rotation and slidable lateral movement thereon, said sprocket wheel having teeth and means on said teeth for carrying a lubricating quantity of a lubricating fluid upward from said reservoir during rotation for deposit on a continuous chain passing thereover.

2. The apparatus of claim 1, wherein at least a portion of said front and rear walls of said reservoir has a height of less than said side walls to thereby provide a means for ingress and egress of a continuous chain carried therethrough.

3. The apparatus of claim 2, wherein said reservoir includes a removeable cover.

4. The apparatus of claim 3 wherein said teeth on said sprocket wheel have a non-smooth surface.

5. The apparatus of claim 4, wherein said teeth possesses a plurality of axial grooves.

6. The apparatus of claim 5, including an adjustable mounting means for fixing said reservoir to a support member.

7. The apparatus of claim 6, wherein said bottom wall of said reservoir includes a threaded stud for receiving said adjustable mounting means.

8. In an improved wheel line irrigating system having a wheeled motorized drive carriage wherein said drive carriage includes a continuous drive chain having an upper and lower flight which connects a power source carried on said drive carriage to a sprocket fixed to an axle of said wheeled drive carriage, said improvement comprising the inclusion of a lubricant holding reservoir positioned intermediate said axle and said power source and in alignment with said continuous chain, said reservoir having a sprocket rotatably carried on a laterally extending axle mounted within said reservoir and over which said upper flight of said drive chain passes, said sprocket being adopted with teeth and means on said teeth for carrying said lubricant from said reservoir and depositing same on said continuous drive chain as it passes thereover.

9. The improved system of claim 8, wherein said sprocket is loosely held on said laterally extending axle to permit latcral movement thereon and thereby permit said sprocket to automatically align itself with said continuous chain.

10. The improved system of claim 9, wherein said teeth on said sprocket have a non-smooth surface.

* * * * *